(12) United States Patent
Nikolaus et al.

(10) Patent No.: US 7,254,156 B2
(45) Date of Patent: Aug. 7, 2007

(54) LINE-NARROWED DYE LASER

(75) Inventors: Bernd Nikolaus, Goettingen (DE);
Ralph Delmdahl, Goettingen (DE);
Eckard Zanger, Seddin (DE);
Christoph Eisenhardt, Berlin (DE)

(73) Assignee: Coherent, Inc., Santa Clara, CA (US)

( * ) Notice: Subject to any disclaimer, the term of this patent is extended or adjusted under 35 U.S.C. 154(b) by 330 days.

(21) Appl. No.: 11/038,335

(22) Filed: Jan. 19, 2005

(65) Prior Publication Data
US 2006/0159150 A1    Jul. 20, 2006

(51) Int. Cl.
*H01S 3/08* (2006.01)

(52) U.S. Cl. .................. 372/98; 372/100; 372/102

(58) Field of Classification Search .............. 372/92, 372/98, 100, 102
See application file for complete search history.

(56) References Cited

U.S. PATENT DOCUMENTS

| | | | |
|---|---|---|---|
| 5,226,050 A | 7/1993 | Burghardt | 372/20 |
| 5,559,815 A | 9/1996 | Berger et al. | 372/25 |
| 5,771,252 A | 6/1998 | Lang et al. | 372/20 |
| 5,781,571 A | 7/1998 | Nabors et al. | 372/21 |
| 5,786,929 A | 7/1998 | Nabors | 359/330 X |
| 5,867,512 A | 2/1999 | Sacher | 372/20 |
| 6,246,707 B1 * | 6/2001 | Yin et al. | 372/25 |
| 6,249,537 B1 | 6/2001 | Merriam et al. | 372/102 |

* cited by examiner

*Primary Examiner*—Armando Rodriguez
(74) *Attorney, Agent, or Firm*—Stallman & Pollock LLP

(57) ABSTRACT

A dye-laser includes a resonator formed between two mirrors. The resonator has a longitudinal Z-axis and transverse X- and Y-axes perpendicular to each other and perpendicular to the Z-axis. A beam of laser radiation circulates in the laser resonator generally in a path along the Z-axis. An optical arrangement is provided for expanding the circulating beam in the Y-axis in one circulation direction and correspondingly compressing the expanded beam in the opposite circulation direction. A diffraction grating having rulings parallel to an X-Z plane of the resonator is located in the resonator in the path of the Y-axis expanded beam. The resonator and the diffraction grating are configured and arranged such that the Y-axis expanded beam is incident on the diffraction grating at a compound angle, is diffracted by the diffraction grating onto one of the resonator mirrors, and is reflected by that mirror back onto the grating such that the circulating laser radiation is incident on the diffraction grating twice per round trip in the resonator.

16 Claims, 4 Drawing Sheets

LINE-NARROWED DYE LASER

TECHNICAL FIELD OF THE INVENTION

The present invention relates in general to dye lasers. The invention relates in particular to line-narrowed dye lasers including an intracavity diffraction grating.

DISCUSSION OF BACKGROUND ART

Dye lasers (lasers wherein a dye is used as a gain-medium) can be tuned over a relatively wide spectral range. Any one such dye can provide a tuning range of about 50 nanometers (nm). The range of such dyes available provides that these tuning ranges are available in a total spectral range ranging from about 320 nm to about 1000 nm. Because of this, dye lasers continue to be favored for research and spectroscopic applications of lasers.

A laser dye has a broad gain-bandwidth. This would cause laser radiation emitted by a dye laser to have a relatively broad bandwidth, absent any provision in the laser resonator to restrict the emitted bandwidth. Ideally the emitted bandwidth of the laser should be no wider than spectral absorption lines in materials being investigated with, or processed by, the laser radiation. Providing such line restriction in a laser resonator is termed "line-narrowing" by practitioners of the laser art.

In an extensively used resonator configuration for providing line narrowing, the resonator is formed between a reflective diffraction grating and a conventional mirror. The mirror may be partially transmitting for coupling radiation out of the resonator. Alternatively, an optical device such as a grazing incidence prism may be used to couple radiation out of the resonator. Radiation generated in such a resonator is within a diffraction order of the grating. The angle of the radiation diffracted from the grating determines the center wavelength of the laser radiation and varying this angle can provide tuning of the laser within the tuning range (gain-bandwidth) of a particular dye. The dispersion provided by the grating limits the range of wavelengths around a particular center wavelength that can circulate in the resonator, thereby providing the line narrowing.

In certain applications, line narrowing provided by the diffraction grating alone may not be sufficient. Further line narrowing for such applications is usually accomplished by placing an etalon within the diffraction-grating-terminated laser resonator. One such resonator configuration is schematically illustrated in FIG. 1, here, a dye laser 10 includes a resonator 12 terminated by a mirror 14 and a diffraction grating 16 having rulings 16R. Resonator 12 includes a dye cell 17 that contains the gain-medium (dye) for the laser. The gain-medium is energized by light from an externally frequency multiplied, neodymium-doped YAG (Nd:YAG) laser 20. Laser 20 in this example delivers frequency-doubled light having a wavelength of about 530 nanometers (nm) via an aperture 22. Alternatively the laser can deliver frequency-tripled light having a wavelength of about 353 nanometers (nm) via an aperture 24. Paths of light from aperture 22 are indicated by dotted lines with the direction of propagation of the light being indicated by open arrowheads.

Light from aperture 22 is directed by a mirror 26 to a beamsplitter 28. Dotted outline 26A indicates an alternative position for mirror 26 for a case where the frequency-tripled light from aperture 24 is used for energizing the dye cell. Beamsplitter 28 reflects a first portion of the light toward dye cell 18 and transmits a second portion of the light. The reflected portion of the light is focused by a spherical lens 30 and a cylindrical lens 32 into the dye cell causing a beam of laser radiation to circulate in resonator 12. Cylindrical lens 32 is oriented such that the light is focused along the path of the beam of laser radiation circulating in resonator 12, here, indicated by solid line F.

A portion $F_{OUT}$ of the radiation circulating in then resonator is reflected at grazing incidence from surface 19 of a prism 18 included in the resonator. Radiation $F_{OUT}$ is directed by a mirror 34 back through dye cell 17. The portion of pump light transmitted by beamsplitter 28 is directed by mirrors 36 and 38 to a beamsplitter 40. Beamsplitter 40 reflects a portion of the light incident thereon and transmits a further portion of that light. The reflected portion of the light is focused by a spherical lens 42 and a cylindrical lens 44 into the path of radiation $F_{OUT}$ traversing the dye cell. Accordingly radiation $F_{OUT}$ is amplified by passage thereof through the dye-cell. The amplified radiation, here, is spatially filtered by a pinhole aperture 46. After spatial filtering the light is relayed by lenses 48 and 50 to another dye-cell amplifying stage (not shown). The dye cell is pumped (energized) by the portion of light transmitted by beamsplitter 40.

Radiation F entering transmitted through surface 19 of prism 18 exits the prism via surface 21 thereof. The transmitted radiation is expanded, in one axis only, by a beam expanding prism 34, thereby providing an expanded beam having an elongated cross-section. Limits of the expanded beam are indicated by solid lines $F_S$ and $F_L$. The expanded beam passes through an etalon 52 onto diffraction grating 16. The expanded beam is incident on the diffraction grating generally at an angle corresponding to that of the diffracted order for a center wavelength around which the output spectrum of the laser is to be narrowed. The center wavelength can be tuned by rotating or tilting diffraction grating 16 about an axis 15 as indicated by double arrow T. Wavelengths close to the center wavelength will return from the diffraction grating through etalon 52 along or close to the paths followed to be incident on the grating. Beam expanding prism 34, of course, compresses the expanded beam returning along the incidence path. One disadvantage of this line narrowing system is that during tuning of the center wavelength the etalon must be rotated synchronously with the grating to match the peak transmission wavelength of the etalon to center wavelength determined by rotating the diffraction grating.

SUMMARY OF THE INVENTION

In one aspect the present invention is directed to narrowing the spectral output of a dye laser. In one preferred embodiment, a laser in accordance with the present invention comprises a laser resonator including a gain-medium. The laser resonator is formed between first and second mirrors and has a longitudinal Z-axis and transverse X- and Y-axes perpendicular to each other and perpendicular to the Z-axis. An arrangement is provided for energizing the gain-medium thereby causing a beam of laser radiation to circulate in the laser resonator generally in a path along the Z-axis. An optical arrangement is provided for expanding the circulating beam in the Y-axis in one circulation direction and correspondingly compressing the expanded beam in the opposite circulation direction. A diffraction grating having rulings parallel to an X-Z plane of the resonator is located in the resonator in the path of the Y-axis expanded beam. The resonator and the diffraction grating are configured and arranged such that the Y-axis expanded beam is incident on the diffraction grating at a compound angle, is diffracted by the diffraction grating onto the first mirror, and is reflected by the first mirror back onto the grating such that laser radiation circulating in the resonator is incident on the diffraction grating twice per round trip in the resonator.

In another aspect, the present invention is directed to a method of operating a laser resonator to provide output simultaneously at two different wavelengths. The laser resonator includes first and second mirrors, a diffraction grating located between the first and second mirrors, and a beam expander for expanding a beam circulating in one direction in the resonator onto the diffraction grating and compressing the expanded beam onto a common path in the opposite direction of circulation. In one preferred embodiment, the method comprises dividing the expanded beam into first and second portions such that the first portion of the expanded beam circulates between the first and second mirrors and is incident twice per round trip on the diffraction grating, and such that the second portion of the beam circulates between the diffraction grating and the first mirror and is thereby incident only once per round trip on the diffraction grating. The beam dividing operation is arranged such that the first and second beam portions are incident at respectively first and second different angles on the diffraction grating. The gain-medium is selected and arranged in the common path of the beam such that both portions of the beam are amplified thereby, whereby the resonator generates laser radiation at first and second different wavelengths corresponding to the first and second different incidence angles on the grating.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain the principles of the present invention.

DETAILED DESCRIPTION OF THE INVENTION

Figure 2:
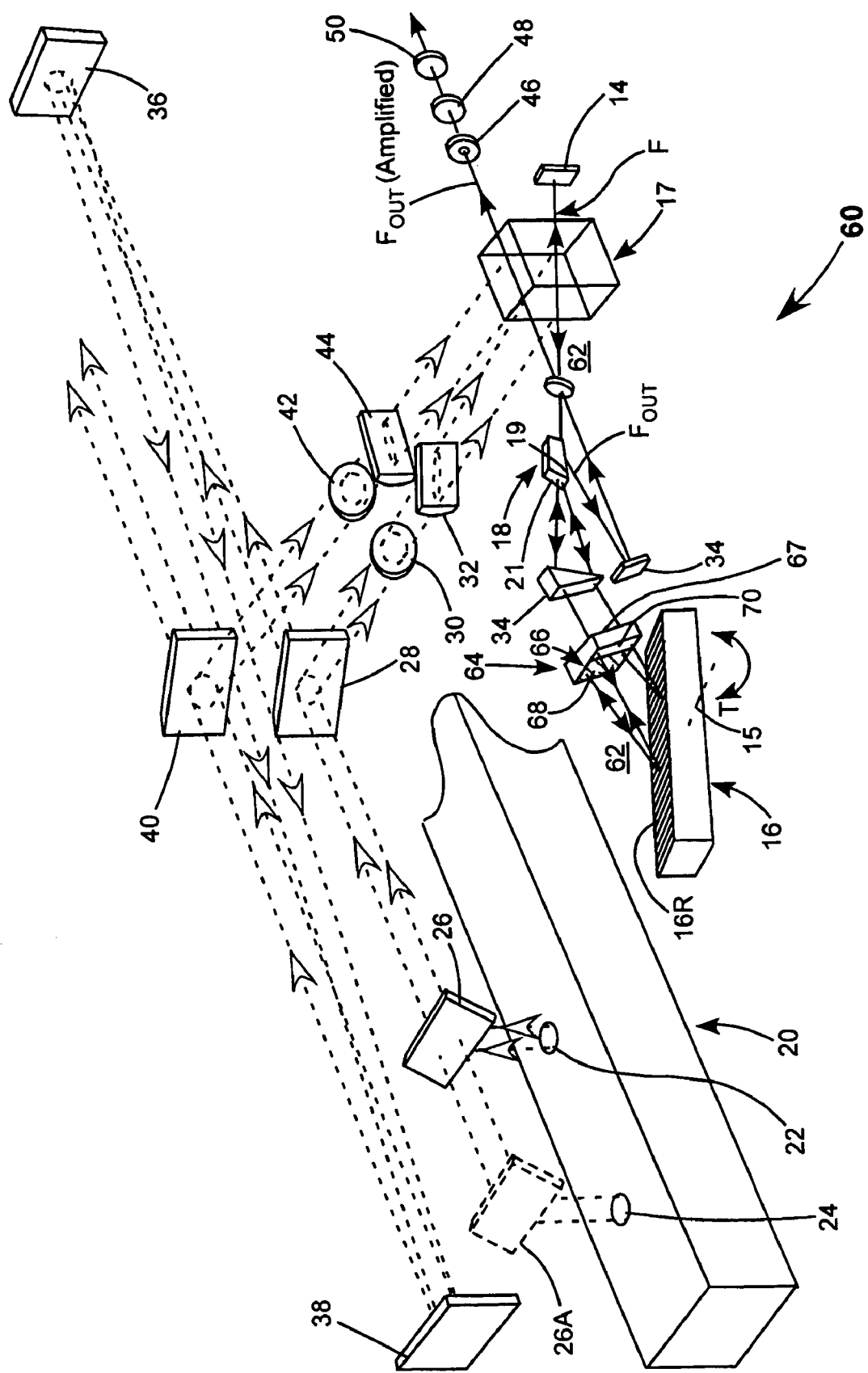
FIG. 2 schematically illustrates one preferred embodiment of a line-narrowed dye laser in accordance with the present invention similar to the laser of FIG. 1 but wherein the etalon is replaced by a partially mirrored, wedge-shaped optical element arranged such that the resonator is terminated by the mirrored portion of the wedge-shaped optical element and the end-mirror and radiation circulating in the resonator is incident twice per round trip therein on the diffraction grating.

Referring now to the drawings, wherein like components are designated by like reference numerals, FIG. 2 schematically illustrates one embodiment 60 of a line-narrowed dye laser in accordance with the present invention. Laser 60 is similar to above-described laser 10 with exceptions as follows.

Etalon 52 of laser 10 is replaced by a wedge-shaped optical element 64 having opposite surfaces 66 and 67. Surface 66 of wedge-shaped optical element 64 faces diffraction grating 16 and includes a reflective coating (mirror) 68 on one portion thereof with another portion 70 thereof being transparent. Coating 68 is highly reflective at a range of wavelengths over which dye laser 60 can be tuned. Surface 67 and portion 70 of surface 66 preferably have a coating thereon for reducing reflection of these surfaces over the same range of wavelengths. End mirror 14 and reflecting coating (mirror) 68 of wedge-shaped optical element 64 form a laser resonator 62 of laser dye-laser 60.

Figure 3A:
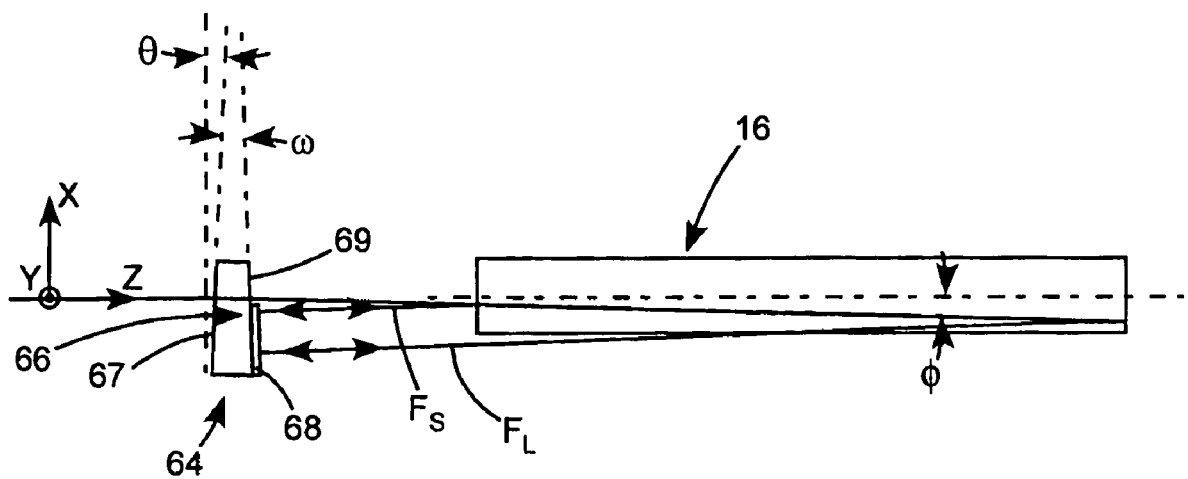
FIGS. 3A and 3B schematically illustrate further detail of the partially mirrored wedge-shaped optical element and diffraction grating of FIG. 2.
Figure 3B:
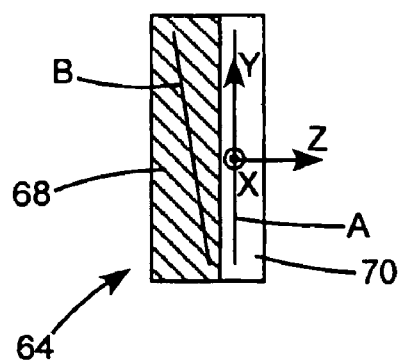

Continuing with reference to FIG. 2 and with reference in addition to FIG. 3A and FIG. 3B, resonator 62 can be defined as having a longitudinal axis Z and transverse axes X and Y perpendicular to each other and perpendicular to the Z-axis. The Z-axis (and X and Y axes perpendicular thereto) of course may be "folded" or tilted by interaction with various resonator components. The beam circulating in the resonator is expanded in the Y-axis only by beam expanding prism 34. This cause the expanded beam to have an elongated cross-section aligned in the Y-direction. Diffraction grating 16 is aligned with rulings 16R thereof (not shown in FIG. 3A) parallel to the an X-Z plane of the resonator. Wedge shaped element 64 has a wedge-angle ω, with the wedge angle being in the X-Z plane. Surface 67 of the wedge-shaped optical element is inclined at an angle θ to the incident beam and positioned such that the expanded laser beam in resonator 62 is transmitted through element 64 via surface 67 and transparent portion 70 of surface 66 thereof. Wedge angle ω is preferably selected to provide the required X-axis angular separation of the incident and diffracted beams while still having the entire beam incident on the grating The Y-axis expanded beam bounded by rays $F_L$ and $F_S$ is incident on diffraction grating 16 at an angle (φ to the conventional (diffraction) incidence-plane thereof, i.e., a plane perpendicular to the rulings of the diffraction grating. Accordingly the expanded beam may be considered as being incident on the grating at a compound angle thereto (i.e. the incoming diffraction angle with respect to the grating plus the tilt of angle φ). After diffraction from the grating the expanded beam is incident generally normally on coating (mirrored portion) 68 of wedge-shaped optical element 64, but inclined at an angle to the Y-axis. This is evident in particular from FIG. 3B, wherein the Y-axis expanded beam transmitted through wedge-shaped optical element 64 is designated by line A (indicating the Y-axis elongated cross-section of the expanded beam), and the diffracted, expanded beam incident on coating 68 is designated generally by line B.

Coating 68 provides an end mirror for a laser resonator, with diffraction grating 16 being located in that resonator, in the path of the expanded beam, as a wavelength-selective element. The diffracted, expanded beam is reflected from the coating 68 back along the incident path thereof. Accordingly, radiation circulating in resonator 62 is interacts with diffraction grating twice per round trip in the resonator compared with once per round trip in the prior-art arrangement of FIG. 1. This provides greater line narrowing than the arrangement of FIG. 1 without a requirement for an intra-cavity etalon.

This arrangement of the mirrored, wedge-shaped optical element 64 in combination with diffraction grating provides the line narrowing of the double-diffraction mirror-and-grating arrangement (usually termed a Littman arrangement by practitioners of the art) with the efficiency of a prism and grating arrangement (usually termed a Littrow arrangement by practitioners of the art). In the prior-art arrangement of FIG. 1, only a limited range of tuning is available with any etalon-grating combination. If a different dye is selected to change the tuning range of the laser 10, a different grating and etalon may need to be installed.

Figure 1:
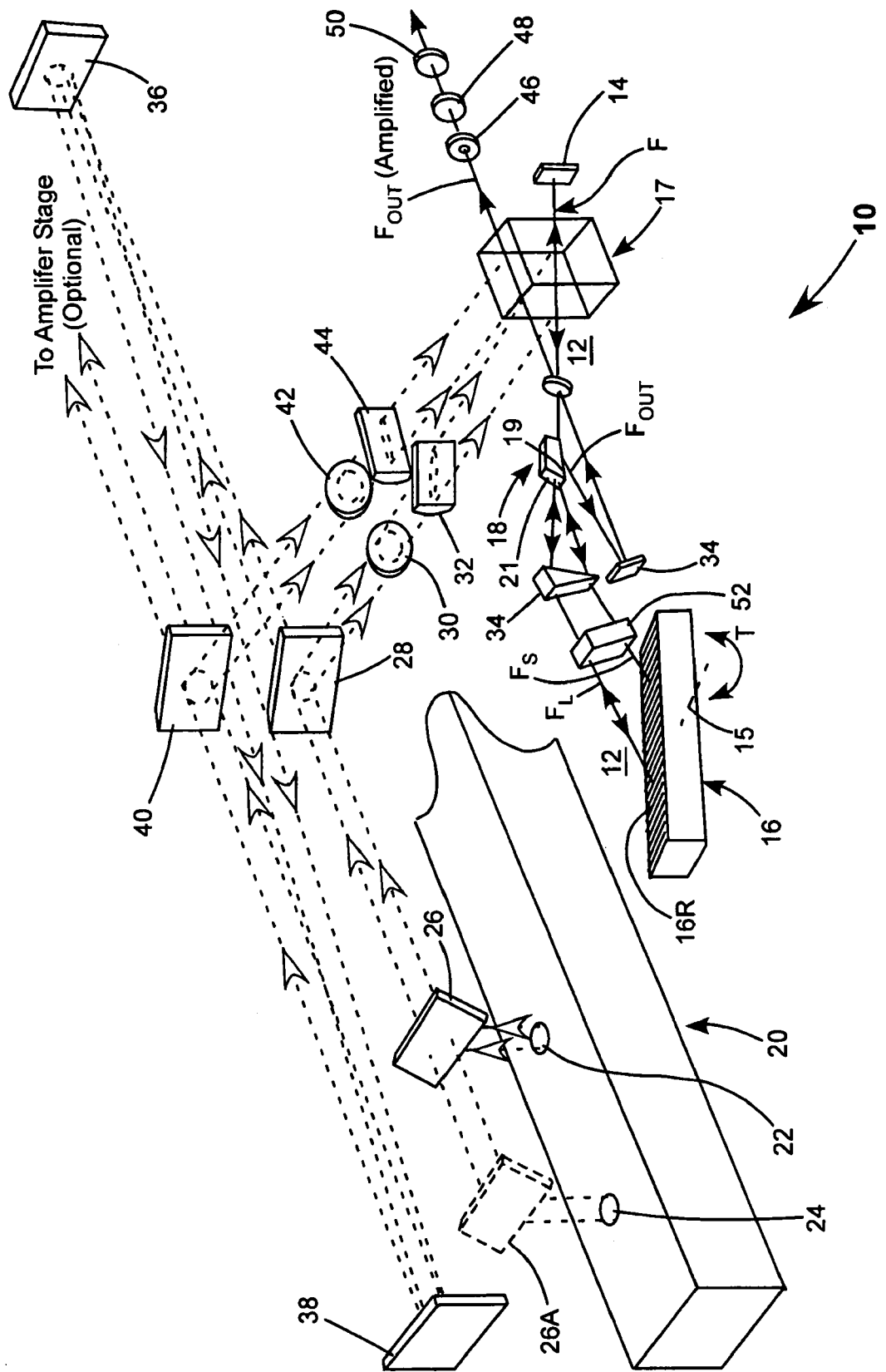
FIG. 1 schematically illustrates a prior art line-narrowed dye laser including a resonator terminated by an end-mirror and a diffraction grating and including an intracavity etalon, with radiation circulating in the resonator being incident once per round trip on the diffraction grating and traversing the etalon twice per round trip.

One example of a laser in accordance with the inventive arrangement of FIG. 2 provided a 55% reduction in output linewidth compared with a corresponding laser in accordance with the prior-art arrangement of FIG. 1. This example of the inventive laser has an output linewidth of between about 0.045 and 0.1 inverse centimeters ($cm^{-1}$), depending on the wavelength of the output radiation.

In laser 60 of FIG. 2 there is no etalon, and surfaces of transparent portion 70 of wedge-shaped optical element 64 are essentially not wavelength selective. Even if reflection reducing coatings are provided on surfaces of the optical element, such coatings can provide an average reflection of less than about 1% over about an octave of frequency, and less than 4% average over 1.5 octaves or greater. Diffraction grating 16 can be configured such that the wavelength ranges of different dyes can be accommodated, if necessary, simply by selecting a different diffraction order of the grating, which provides that the actual diffraction angle of the grating during tuning is always within a range that can be accommodated by the physical arrangement of wedge-shaped optical element 64 and the diffraction grating.

In many spectroscopic applications in which dye lasers are used, it would be useful to have a laser that provided output simultaneously at two different, relatively closely spaced wavelengths. One of the wavelengths could be tuned to a particular resonance absorption peak of a sample being analyzed with the other wavelength being at a wavelength outside of the absorption peak and used for comparison purposes. The inventive laser can be configured to provide such a dual-wavelength output as described below with reference to FIG. 4, in which, for convenience of illustration, only a relevant portion of the laser (hereinafter designated laser 60A) is depicted.

Figure 4:
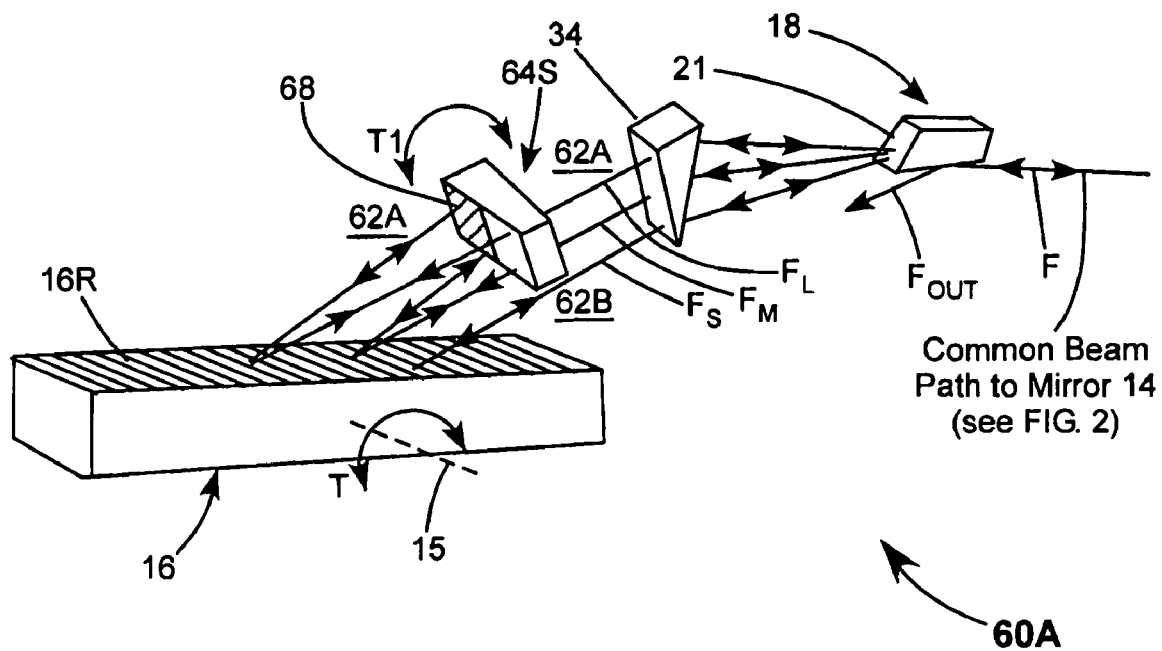
FIG. 4 schematically illustrates another preferred embodiment of a line narrowed dye laser in accordance with the present invention, similar to the laser of FIG. 2 but wherein the wedge-shaped optical element is made shorter, and is arranged such that one portion of radiation circulating in the resonator is incident twice per round trip on the diffraction grating while another portion is incident only once per round trip, whereby the laser emits radiation at two different wavelengths.

In the arrangement of FIG. 4 a wedge-shaped optical element 64S is substituted for wedge-shaped optical element 64 of the laser of FIG. 2. Wedge-shaped optical element 64S is shorter (in the Y-axis) than optical element 64 such that portion (designated by ray $F_S$ in FIG. 4) of the expanded beam in the resonator bypasses optical element 64S, is incident (once only per round trip) on the diffraction grating 16, aligned with the diffraction incidence-plane of the grating, i.e. at a simple angle to the grating, and, accordingly, is diffracted back along the incident path. A remaining portion of the expanded beam (designated by ray $F_M$ and $F_L$ in FIG. 4) is transmitted through the wedge-shaped optical element and is incident at a compound angle twice per round trip on diffraction grating 16 as described above with reference to laser 60 of FIG. 2. The two beam portions, of course, are incident on different portions of the diffraction grating in a different alignment with the diffraction grating. An effect of this is that laser 60A includes a resonator having two branches. One resonator branch 62A is formed between mirrors 14 and 68 as in resonator 62 of laser 60. The other resonator branch 62B is formed between mirror 14 and diffraction grating 16. The resonator branches have a common path as indicated by beam F. As a result of the passage of radiation in one resonator branch through wedge-shaped optical element 64 and the different incidence alignment of the expanded beam portions on diffraction grating 16, one of the resonator branches oscillates at a different wavelength from the other. The two different wavelengths follow common path F through the gain-medium and are both delivered as output radiation by the laser by the grazing incidence reflection from prism 18, which is on the common path.

Figure 5:
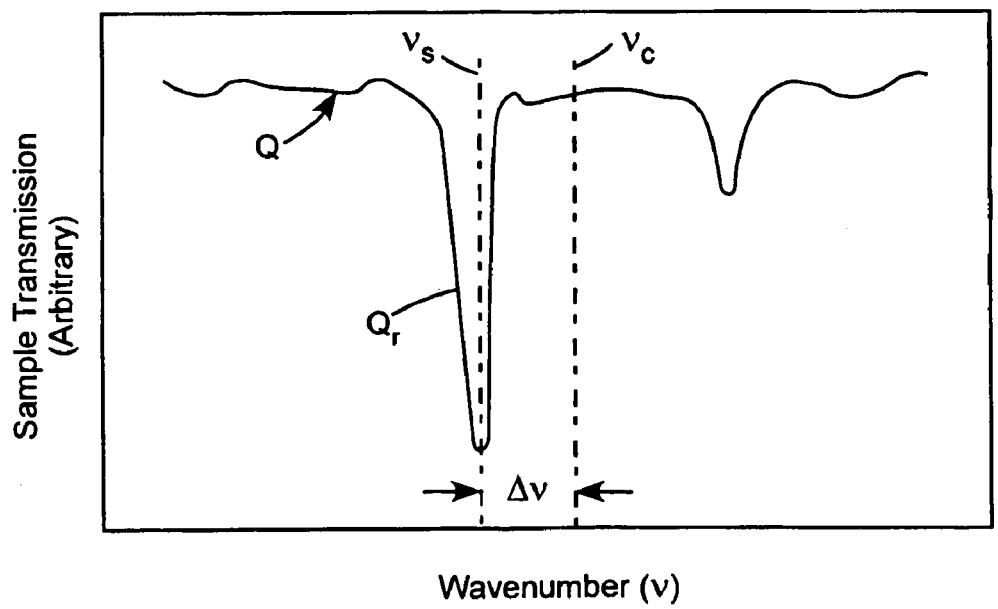
FIG. 5 is a graph schematically illustrating transmission as a function of wavenumber of a hypothetical sample being analyzed by a two-wavelength output of the laser of FIG. 4, with one output wavelength tuned to a resonance absorption region of the sample and the other output wavelength outside the resonance absorption region.

FIG. 5 is a graph schematically illustrating transmission as a function of wavenumber (curve Q) of a hypothetical sample being analyzed by the two-wavelength output of laser 60A of FIG. 4. One output wavelength, having a wavenumber designated by dashed line $v_s$, is tuned to a resonance absorption region ("line") $Q_r$ of the sample. The other output wavelength, having a wavenumber designated by dashed line $v_c$, is tuned to a wavenumber outside the resonance absorption region. The two output wavelengths (wavenumbers) may be simultaneously tuned by tilting diffraction grating 16 about the X-axis as indicated in FIG. 4 by arrow T. The spectral separation of the wavenumbers (difference between the wavelengths), designated $\Delta v$ in FIG. 5, is adjustable by tilting wedge-shaped optical element 64S about the X-axis as indicated by arrow T1 in FIG. 4.

Those skilled in the art will recognize that in laser 60A only one of the output wavelengths will enjoy the spectral line-narrowing provided by a double incidence (per round trip) on diffraction grating 16. This wavelength, of course, would be preferred as the wavelength tuned to a resonance absorption region. Since the other wavelength is tuned to a relatively wavelength insensitive region of the sample, the greater spectral linewidth does not present a particular disadvantage in the exemplary application. Those skilled in the art will recognize without further illustration that this disadvantage could be overcome, for example, by providing two wedge-shaped optical elements arranged one above the other in the Y-axis and together transmitting (and reflecting) all of the expanded beam, but having different wedge angle or tilt angles.

The present invention is described above in terms of a preferred and other embodiments. The invention is not limited, however, to the embodiments described and depicted. Rather, the invention is limited only by the claims appended hereto.

What is claimed is:

1. A laser, comprising:

a laser resonator including a gain-medium, said laser resonator being formed between first and second mirrors and having a longitudinal Z-axis and transverse X- and Y-axes perpendicular to each other and perpendicular to said Z-axis;

an arrangement for energizing said gain-medium, thereby causing a beam of laser radiation to circulate in said laser resonator generally in a path along said Z-axis thereof;

an optical arrangement for expanding said circulating beam in one circulation direction thereof in said Y-axis of said resonator and correspondingly compressing said expanded beam in an opposite circulation direction of said beam; and a diffraction grating having rulings parallel to a X-Z plane of said resonator and located in said laser resonator in the path of said Y-axis expanded beam, said resonator and said diffraction grating therein being configured and arranged such that said Y-axis expanded beam is incident on said diffraction grating at a compound angle thereto, is diffracted by said diffraction grating onto said first mirror, and is reflected by said first mirror back onto said grating such that laser radiation circulating in said laser resonator is incident on said grating twice per round trip in said resonator and wherein said laser resonator includes a wedge-shaped optical element located in said laser resonator in the path of said expanded beam between said beam expanding arrangement and said diffraction grating, said wedge-shaped optical element having a wedge angle in said X-Z plane of said resonator and being arranged with respect to said diffraction grating and said first mirror, such that said expanded beam is transmitted therethrough, and is incident on said diffraction grating at said compound angle.

2. The laser of claim 1, wherein said first mirror is located on a portion of a surface of said wedge-shaped optical element.

3. A laser, comprising:

a first laser resonator including a gain-medium, said laser resonator being formed between first and second mirrors and having a longitudinal Z-axis and transverse X- and Y-axes perpendicular to each other and perpendicular to said Z-axis;

an arrangement for energizing said gain-medium thereby causing a beam of laser radiation to circulate in said first laser resonator generally in a path along said Z-axis thereof;

an optical arrangement for expanding said circulating beam in one circulation direction thereof in said Y-axis of said first laser resonator and correspondingly compressing said expanded beam in an opposite circulation direction of said beam;

a diffraction grating located in said first laser resonator in the path of said Y-axis expanded beam, said diffraction grating having rulings parallel to an X-Z plane of said resonator; and a wedge-shaped optical element located in said first laser resonator between said beam expanding arrangement and said diffraction grating, said wedge-shaped optical element having a wedge angle in said X-Z plane of said first laser resonator and being arranged with respect to said diffraction grating and said first mirror, such that at least a part of said expanded beam is transmitted therethrough, is incident on said diffraction grating at a compound angle, is diffracted by said diffraction grating onto said first mirror, and is reflected by said first mirror back onto said grating in a reverse direction along said incident path, whereby laser radiation circulating in said first laser resonator is incident twice per round trip therein.

4. The laser of claim 3, wherein all of said expanded beam is transmitted through said wedge-shaped optical element.

5. The laser of claim 3, wherein any portion of said expanded beam not transmitted through said wedge-shaped optical element is incident on said diffraction grating and is diffracted thereby back along said direction of incidence, thereby forming a second laser resonator between said diffraction grating and said second mirror with laser radiation in said first and second resonators following a common path through said gain-medium.

6. The laser of claim 5, wherein laser radiation circulating in said first resonator has a first wavelength, laser radiation circulating in said second laser resonator has a second wavelength, and radiation at both of said wavelengths is delivered by said laser.

7. The laser of claim 3, wherein said first mirror is located on a portion of a first surface of said wedge-shaped optical element.

8. The laser of claim 7, wherein said first surface of said optical wedge-shaped optical element faces said diffraction grating.

9. A laser, comprising:

a first laser resonator including a gain-medium, said laser resonator being formed between first and second mirrors and having a longitudinal Z-axis and transverse X- and Y-axes perpendicular to each other and perpendicular to said Z-axis;

an arrangement for energizing said gain-medium thereby causing a beam of laser radiation to circulate in said first laser resonator generally in a path along said Z-axis thereof;

an optical arrangement for expanding said circulating beam in one circulation direction thereof in said Y-axis of said first laser resonator and correspondingly compressing said expanded beam in an opposite circulation direction of said beam;

a diffraction grating located in said first laser resonator in the path of said Y-axis expanded beam, said diffraction grating having rulings parallel to an X-Z plane of said resonator; and a wedge-shaped optical element located in said first laser resonator between said beam expanding arrangement and said diffraction grating, said wedge-shaped optical element having a wedge angle in said X-Z plane of said first laser resonator and being arranged with respect to said diffraction grating and said first mirror, such that said expanded beam is transmitted therethrough, is incident on said diffraction grating at a compound angle, is diffracted by said diffraction grating onto said first mirror, and is reflected by said first mirror back onto said grating in a reverse direction along said incident path, whereby laser radiation circulating in said first laser resonator is incident twice per round trip therein.

10. A laser, comprising:

a laser resonator having first and second branches and a common path said laser resonator and said branches thereof having a longitudinal Z-axis and transverse X- and Y-axes perpendicular to each other and perpendicular to said Z-axis;

a gain-medium located in said laser resonator on said common path thereof;

an arrangement for energizing said gain-medium thereby causing a beam of laser radiation to circulate along said common path of said laser resonator generally in a path along said Z-axis thereof;

said first branch of said laser resonator being formed between first and second mirrors;

an optical arrangement for expanding said common-path circulating beam in one circulation direction thereof in said Y-axis of said first laser resonator and correspondingly compressing said expanded beam in an opposite circulation direction of said expanded beam;

a diffraction grating located in said laser resonator in the path of said Y-axis expanded beam, said diffraction grating having rulings parallel to an X-Z plane of said resonator; and a wedge-shaped optical element located in said first laser resonator between said beam expanding arrangement and said diffraction grating, said wedge-shaped optical element having a wedge angle in said X-Z plane of said laser resonator and being configured and arranged with respect to said Z axis, said diffraction grating and said first mirror, such that at a first portion of said expanded beam is transmitted therethrough, is incident on said diffraction grating at a compound angle thereto, is diffracted by said diffraction grating onto said first mirror of said first branch of said laser resonator, and is reflected by said first mirror back onto said grating in a reverse direction along said incident path, whereby laser radiation circulating in said first branch of said laser resonator is incident twice per round trip therein;

said second branch of said laser resonator being formed between said second mirror and said diffraction grating, said wedge-shaped optical element and said diffraction grating being arranged such that a second portion of said Y-axis expanded beam bypasses said wedge-shaped element, is incident on said diffraction grating aligned at a simple angle thereto, and is diffracted back along said incident path; and wherein, radiation circulating in said first branches and second branches of said laser resonator has respectively first and second wavelengths within the gain-bandwidth of the gain-medium, said first and second wavelengths being different, and wherein said laser resonator is arranged to deliver both of said radiation wavelengths as output radiation.

11. The laser of claim 10, wherein any one of said first and second wavelengths is adjustable by tilting said diffraction grating about said X-axis, and the wavelength difference between said first and second wavelengths is adjustable by tilting said wedge-shaped optical element about said X-axis.

12. A method of operating a laser resonator, the laser resonator including a gain-medium, first and second mirrors, a diffraction grating located between the first and second mirrors and a beam expander for expanding a beam circulating in one direction in the resonator onto the diffraction grating and compressing the expanded beam onto a common path in the opposite direction of circulation, the method comprising:

dividing the expanded beam into first and second portions such that said first portion of said beam circulates between said first and second mirrors and is incident twice per round trip on said diffraction grating, and such that said second portion of said beam circulates between said diffraction grating and said first mirror and is thereby incident only once per round trip on said diffraction grating said beam dividing being such that said first and second beam portions are incident at respectively first and second different angles on said diffraction grating; and selecting and arranging the gain-medium in the common path in the resonator such that both portions of the beam are amplified thereby, whereby the resonator generates laser radiation at first and second different wavelengths corresponding to the first and second different incidence angles on the grating.

13. The method of claim 12, wherein the gain-medium is a laser dye.

14. The method of claim 12, wherein said beam dividing is effected by locating a wedge-shaped optical element is the laser resonator partially in the path of said expanded beam such that said first portion of the expanded beam is transmitted through said wedge-shaped element, is on the diffraction grating, is diffracted by the diffraction grating onto the second mirror, and is reflected by the second mirror back onto the diffraction grating, and such that said second portion of the expanded beam bypasses said wedge-shaped element, is incident on the diffraction grating, and is diffracted by the diffraction grating back along the direction of incidence.

15. The method of claim 14, wherein said first beam portion is incident on said diffraction grating at a compound angle therewith.

16. A laser comprising:
a resonator having a gain medium located between first and second end mirrors;
a pump source for exciting the gain medium to generate a beam of laser radiation;
a diffraction grating located in the resonator; and
a wedge shaped optical element located within the resonator and positioned to direct laser radiation passing therethrough to reflect off the grating onto said first mirror and then reflect back onto the grating and back through the wedge so that radiation circulating in said laser resonator is incident on said grating twice per round trip in said resonator and wherein said first mirror is located on a portion of a surface of said wedge shaped optical element.

* * * * *